(12) United States Patent
Factor

(10) Patent No.: US 6,564,112 B1
(45) Date of Patent: May 13, 2003

(54) METHOD OF CUSTOMIZING ELECTRONIC SYSTEMS BASED ON USER SPECIFICATIONS

(75) Inventor: Richard Factor, Kinnelon, NJ (US)

(73) Assignee: Eventide Inc., Little Ferry, NJ (US)

(*) Notice: Subject to any disclaimer, the term of this patent is extended or adjusted under 35 U.S.C. 154(b) by 0 days.

(21) Appl. No.: 09/437,771

(22) Filed: Nov. 8, 1999

(51) Int. Cl.$^7$ ............................................. G06F 19/00
(52) U.S. Cl. ............................ 700/97; 700/95; 703/13; 716/1
(58) Field of Search ............................ 700/94, 95, 97, 700/103, 104, 105; 703/1, 13; 705/26; 716/1, 5, 16

(56) References Cited

U.S. PATENT DOCUMENTS

| | | | | |
|---|---|---|---|---|
| 5,068,823 A | * | 11/1991 | Robinson | 716/16 |
| 5,812,414 A | * | 9/1998 | Butts et al. | 703/13 |
| 5,966,310 A | * | 10/1999 | Maeda et al. | 345/866 |
| 6,006,195 A | * | 12/1999 | Marchak et al. | 700/95 |
| 6,167,383 A | * | 12/2000 | Henson | 703/13 |
| 6,202,197 B1 | * | 3/2001 | Robinson et al. | 703/14 |
| 6,236,901 B1 | * | 5/2001 | Goss | 361/692 |
| 6,249,714 B1 | * | 6/2001 | Hocaoglu et al. | 700/28 |
| 6,393,591 B1 | * | 5/2002 | Jenkins et al. | 714/725 |
| 6,438,435 B1 | * | 8/2002 | Wada et al. | 700/97 |

OTHER PUBLICATIONS

Orville™ Operating Manual (Eventide, Inc., part No. 141032, Manual Release 1.1, Jul. 28, 1999, pp. 1–111 (entire document).

"Orville Presets V2.600" dated Aug. 18, 1999 (pp. 1–8) and two-page document entitled "Read Me First!", dated Aug. 18, 1999, Eventide, Inc.

Orville™ Programming Manual (Eventide, Inc., part No. 141035, Manual Release 1.1, Jul. 28, 1999, pp. 1–97 (entire document).

Orville™ Modules Manual (Eventide, Inc., part No. 141035a, Manual Release 1.1, Jul. 29, 1999, pp. 1–98 (entire document)).

VSIGFILE User Manual V1.0 (Eventide, Inc., Jan. 13, 1997, pp. 1–22 (entire document)).

* cited by examiner

*Primary Examiner*—Leo Picard
*Assistant Examiner*—Paul Rodriguez
(74) *Attorney, Agent, or Firm*—Ostrolenk, Faber, Gerb & Soffen, LLP

(57) ABSTRACT

A method and system for manufacturing a particular system based on a universal system. The method includes designing the particular system on the universal system. The particular system as implemented on the universal system is then tested. The system is re-designed and re-tested until the particular system as tested on the universal system is acceptable. The final design of the particular system is sent to a manufacturer to be built using the elements of the universal system used to implement the particular system. After the manufacturer receives the design of the particular system as implemented on the universal system, it identifies the elements of the universal system used to implement the particular system. The particular system is constructed using those elements of the universal system.

9 Claims, 8 Drawing Sheets

METHOD OF CUSTOMIZING ELECTRONIC SYSTEMS BASED ON USER SPECIFICATIONS

BACKGROUND OF THE INVENTION

1. Field of the Invention

The invention relates to methods and systems for designing, ordering and customizing electronic systems. In particular, it relates to creating a customized electronic system based on a user specification created using a universally configurable system.

2. Related Art

Creation of customized electronic systems is common and wide-ranging. In one well-known example, military contractors are provided with detailed specifications by the Defense Department; the systems are subsequently designed, constructed and delivered to the customer (i.e., the Defense Department in this example).

Other familiar examples include construction of semi-customized computer systems such as those offered by Gateway Computers. The customer can order a computer tailored to his or her needs, selecting items such as processors, drives and modems. The company then builds the particular computer and ships it to the customer. The customer, however, has a limited number of stock components to choose from and cannot test the final system prior to its construction and delivery.

Electronic systems, such as audio systems, also have longstanding practices of customization based on the user's needs. Often an audiophile or a musician becomes familiar enough with a system or component to make the change him or herself, often by trial and error. Commercial establishments have also offered customization services of existing systems or components, based on the user's design or description of the end sound or result. Commercial establishments have also provided construction of complete systems or components based on a customer's design, or its own design based on a customer's description. All of these various schemes also suffer from the drawback that the first time the customer hears or otherwise evaluates the system or component is after it is constructed and delivered.

Electronic systems currently exist that incorporate a wide range of features, functions and capabilities. Some such systems allow a user to design a particular system by configuring and customizing programmed features within the system, and then testing the configuration. In addition, some systems permit the user to program a particular'system using more elemental features supported by the system, and the programmed configuration may also be tested. If the configuration is acceptable, the system so configured may be implemented for its desired purpose. If not, it can be reconfigured by re-programming the system until acceptable. If the specifications change over time, or become unnecessary, the system may be reconfigured to the new specifications or reimplemented in a completely different configuration.

A prominent example of an electronic system described immediately above are programmable digital signal processors (DSP), including digital effects processors. Early effects processors used analog circuitry and devices, along with knobs and other switches for adjusting parameters. For example, shift registers were used for delay and circuitry was used for frequency adjustment.

With today's DSPs, a microprocessor interfaces with DSP chips and are programmed to create the desired effects and outputs from the chips. At a fundamental level, the DSP may be programmed with a large set of modules, which each contain a digital processing capability, general control function and/or a mathematical function. In addition, DSP manufacturers may create and store a set of DSP processing program segments, each of which provides a certain sound, effect, or other function for the user. These segments, or "presets", are generally comprised of one or several modules. The user typically has the ability to alter the parameters or variables that are used in the presets. For example, for a filter preset, the DSP allows the user to change the frequency parameters of the filter. Depending on the particular DSP function invoked, external inputs may or may not be needed.

An example of such a DSP is the Orville™ Audio Effects Processor by Eventide, Inc., the assignee of the present invention. The Orville™ is a programmable, multi-channel, digital signal processor. The Orville™ has two processors and also includes numerous electronic modules, each providing digital signal processing capabilities, general control and/or mathematical functions. The Orville™ includes hundreds of presets (alternatively referred to as "programs") configured in various ways to provide a menued array of reverbs, pitch shifters, distortion, dynamics, equalization, phasing, flanging and other music and production effects.

The user can thus invoke the presets of the Orville™ via a menu to exploit their intended effect. For effects that operate on external inputs (as opposed to, for example, effects that are entirely generated internally), the Orville™ has a number of input interfaces. Using a menu on the face of the Orville™, the user can adjust the parameters (or variables) of the preset. For example, if the preset is a low pass filter, the user can adjust the frequency cutoff. The user can also store the preset with the adjusted parameters as a separate customized program.

Digital signal processing units may also be programmable, thus allowing the user to create his or her own effects, instead of being limited to the presets or programs chosen by the manufacturer. For example, the Orville™ is also programmable by the user. By using programming accessed via the front panel of the Orville™, or by using software supplied by the manufacturer that is loaded onto a PC, the user may construct a desired configuration of the modules of the Orville™ by selecting the modules used, creating the inputs and outputs between modules and adjusting the parameters of the modules. The software also allows the user to assign parameters to the knobs and other manual controls on the front panel of the Orville™, thus giving the user the ability to manually adjust these selected (adjustable) parameters (such as gain, output channel, etc.) for the designed effect. Meters (such as simulated meters, including LCDs) displaying certain parameters (such as amplitude) may also be programmed for display on the front panel of the Orville™.

Once the effect is designed, the design is downloaded to the microprocessor of the Orville™, which "builds" the designed effect from the modules. The execution (or "build") of each such effect is done by creating programming that links the various modules together in the manner designed by the user. The build takes only a few seconds, thus giving the user a near simultaneous experience of the effect. The user can experiment by making quick changes to the design and immediately experience the effect.

The programmability of the Orville™ and like DSPs allows the user to experiment by implementing effects that may be more complex than the presets. For example, the user may combine modules to have a filter followed by a delay followed by a phase shift. The effect may be immediately built and tested. Adjustments may be made to the parameters of the effect, or it can be re-designed and immediately re-tested.

While electronic systems that incorporate a wide range of features, functions and capabilities, including those that are configurable, such as the Orville™, provide the advantage of allowing the user to design and/or test particular functions, and then to reconfigure the system as desired at a later time, they have a number of disadvantages. Such "universal" systems are often relatively expensive, since they include software and/or hardware that provide the user with so many options. Implementation of particular effects using the universal system is thus a costly and inefficient use of the device, because the true power of the universal system is its capacity to develop effects. For example, a small studio may have a number of particular effects that it wants to implement and regularly use over an extended period of time. Implementing a number of effects using one or a few Orvilles™ requires (at least) re-programming the Orville™ and integrating it in the particular setting for the desired effect. This is (at best) time consuming and tedious. It can delay production, or, when more simultaneous effects are needed than available Orvilles™, limit the desired production. Generally, a small studio will not have (or be willing to expend) the resources to purchase a separate Orville™ to implement each effect. Finally, use of the Orville™ to implement effects can hinder the work of those developing new effects.

SUMMARY OF THE INVENTION

The invention includes a commercial method of customizing a particular system from a universal system having numerous constituent capabilities that, are configurable. The user designs a particular system and implements the particular system by accessing and configuring the universal system. The user then tests the particular system as configured. If the test results indicate that the particular system is acceptable, then the configuration is not changed. If the test results are not acceptable, then the universal system is re-configured and the particular system as re-configured is tested until the resulting particular system is acceptable.

Once a design configuration of a particular system is found acceptable by the user, as described further below, the design specification is then sent by the user to a manufacturer for construction of an individual unit based on the design. The user is thus also the "customer" of the manufacturer and the terms "user" and "customer" will be used interchangeably (and sometimes together) in the description below. The "manufacturer" includes any person(s) or entity that performs the services as described below. In particular, hardware and/or software from the universal system that is not needed to support the particular system as designed by the user is excluded.

The manufacturer also offers one or a number of front panels, which include buttons, knobs, displays, etc., arranged in one or more standard configurations. These buttons, knobs, etc. may be used to provide control of the adjustable parameters and inputs of the particular system designed. The user (customer) adapts the designed system to work with one of the front panel arrangements, thus providing external inputs and control signals to the system. As part of the specifications sent to the manufacturer, the user includes legends and calibrations for the knobs, levers, meters, etc. for the chosen panel. The user also supplies artwork for the front panel, so that it will look customized.

Alternatively, the user may design and supply the manufacturer with a completely custom design of the front panel, including a completely custom layout of knobs, buttons, displays, etc. selected by the user for the front panel. These knobs, buttons, etc. likewise provide the control interface between the user and the adjustable parameters of the particular system.

The manufacturer uses the design specifications sent by the user to implement the particular system in a stand-alone device. Only those constituent capabilities of the universal system needed to support the particular system are included in the implementation, configured as specified by the user. In particular, hardware and/or software from the universal system that is not needed to support the particular system is largely or completely excluded.

The manufacturer also creates the front panel for the particular system based upon the design sent by the user. As noted above, this may be one of a number of particular panel configurations offered by the manufacturer that the user adapts to the designed system. Alternatively, it can be a completely customized panel designed by the user for the system. The unit created by the manufacturer also has input and output connections that interface with the designed system, as well as the labels, calibrations and other artwork supplied by the user. When complete, the stand-alone unit is tested and then delivered to the user.

The method is an extremely efficient and economical method and system for constructing highly customized end products. The customer uses the comprehensive universal system as a design and testing tool, but does not use it to actually implement particular systems. The customer may use only a small fraction of the capabilities of the universal system in the design of the particular system. In addition, the particular system is built in an economical manner by being implemented using only the standardized constituent components (such as hardware and/or software) of the universal system that are needed. Thus, only a short time is required to manufacture the particular system and the cost of manufacturing and delivering the particular system can be a fraction of the cost of the universal system.

In addition, because the particular system delivered to the customer uses the same constituent components as the universal system and is configured in the manner designed by the customer, it will perform identically to the one that was implemented and tested by the customer on the universal system. This substantially reduces or eliminates customer dissatisfaction and returns of the delivered system, which also contributes to an overall reduction in manufacturing costs.

Also, because the front panel is customized by the customer, who uses his own artwork, the delivered system also looks customized for the customer and/or his or her business. Customer satisfaction with this aspect of the delivered product will also be high, again reducing the cost associated with customer dissatisfaction and returns.

DETAILED DESCRIPTION

Figure 1:
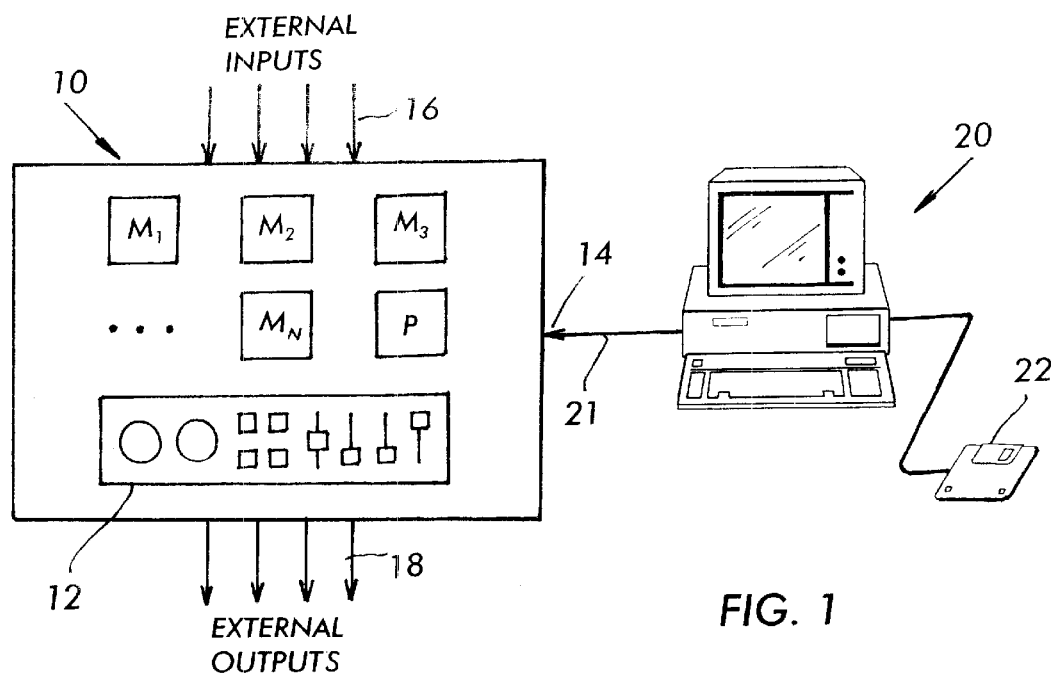
FIG. 1 is representative drawing of a universal system used in accordance with the present invention.

FIG. 1 shows a universal system 10 having external inputs 16, outputs 18, a set of user interfaces 12 and a computer interface 14. System 10 also includes a plurality of modules M1, M2, . . . Mn. Modules M1–Mn may include electronic devices or elements, such as amplifiers, transistors, transformers, gates, etc., or larger systems comprising such devices or elements configured together. They may also include programmed features supported by hardware logic (chips, etc.) and software in the system 10. A universal system 10 may have modules comprised of each type of the above-described exemplary elements, i.e., both analog and digital modules.

The system 10 also includes a processor P that interfaces with the modules, as further explained below. Processor P also interfaces with the set of user interfaces 12, as also explained below.

Processor P includes programming for invoking the individual modules and/or pre-programmed arrangements of two or more modules. Following the terminology introduced above, such programming for invoking individual modules and/or pre-programmed arrangements of two or more modules are referred to as "presets". The presets may be selected through a menu on the user interface 12, which also allows the user to adjust parameters or variables for the presets through the menu itself and/or knobs, buttons, etc. on the user interface 12. A preset may include simply invoking a module by itself, or may include more complicated pre-programmed configurations of modules, with one module's output supplying the input to another module or modules.

When the modules are supported by hardware logic (supported, for example, on chips) and software, the processor P interfaces with the hardware logic and runs a stored program corresponding to the preset. The processor P directs data to and from the various hardware logic needed for executing the preset and also accesses input at the external inputs and the user interface (if any) for use in the processing. Processor P also directs output of the preset to the external outputs. If analog components are utilized in the universal system, then processor P may interface with a network of switching devices (such as transistors, relays, etc), which are configured by software in the appropriate manner.

If a preset chosen by the user requires external input(s), the programming of processor P selects one or more of the external inputs 16 and configures it to receive the external input(s). Processor P directs the output(s) of the preset chosen by the user to one or more of the external outputs 18.

A computer 20, such as a personal computer (PC), may also be used by a user to design particular systems based on the individual modules M1–Mn and/or presets supported by the universal system 10. A data cable 22 connects the PC with the interface 14 of system 10. Software loaded into the computer 20 allows the user to design and construct a particular system by configuring individual modules and/or presets of the universal system 10. Once the particular system is designed, the software in the PC sends instructions to the processor P of the universal system 10. universal system 10. A data cable 22 connects the PC with the interface 14 of system 10. Software loaded into the computer 20 allows the user to design and construct a particular system by configuring individual modules and/or presets of the universal system 10. Once the particular system is designed, the software in the PC sends instructions to the processor P of the universal system 10.

The processor P executes the instructions received from the PC to configure the designed system. Processor P may either directly use the software from the PC, or may generate its own software based bn that received from the PC. Where processor P, for example, interfaces with the inputs and outputs of analog electronic components or elements of the universal system, processor P may interface with switching hardware, for example, to arrange the necessary connections between the elements or devices, also incorporating the processor P itself in implementation of the particular system, if necessary. Where the universal system 10 includes modules and/or presets that are supported via hardware logic and software, processor P may use the program from the PC to invoke the particular programming for the module and/or presets at the appropriate time, also directing data generated by one module to another, when necessary. Processor P may also direct any necessary data supplied at the external inputs 16 to the appropriate module(s), when necessary. (As noted above, processor P may alternatively generate its own software corresponding to the design based on the design received from the PC.)

If necessary, the programming executed by processor P also configures user interfaces 12 with the system designed by the user. The user interfaces 12 are a set of knobs and switches that can be configured as part of the particular system to provide manual control of parameters of the particular system provided by the user. Processor P may configure a user interface to provide a direct input to a module or modules or a preset, or the processor P may receive the input from the user interface and (after processing, if necessary) provide an appropriate input to the appropriate module or preset.

Processor P thus utilizes the modules and/or presets of the universal system in the manner designed by the user. Configuring the particular system can also incorporate the processor P itself in implementation of the particular system. The software instructions generated and/or compiled by processor P may be stored in memory of the universal system 10 for later applications.

Thus, particular systems may be implemented by the user via the universal system in a number of ways. In one case, the user may simply invoke one of the presets of the universal system and customize the adjustable parameters for the preset. In another case, the user designs a particular system by configuring modules and/or presets. The particular system designed may also include user control over adjustable parameters of the modules or presets and also designate which knobs, buttons, etc. on the user interface 12 will supply the control. The particular system may also include external inputs to the modules or presets used in the design supplied at external input interface 16. It may also include external outputs from the modules or presets used in the design supplied to external output interface 18.

Once a particular system has been designed by the user and implemented within the universal system 10, the particular system is tested by the user. This may be done, for example, through a menu on the user interface 12. The user may provide required inputs to the particular system through the external input interface 16 and may control certain adjustable parameters of the particular system via the knobs, buttons, etc. on the user interface 12 configured as part of the particular system. Output from the particular system is via external output interface 18.

If the user is not satisfied with the results (output) and/or controls of the particular system designed, the particular system may be re-designed using the computer 20 and software supported therein, as described above. The re-designed system may then be sent to processor P and implemented in the universal system, also as described above. The re-designed system may be tested and, if not to the user's satisfaction, re-designed in the same manner until it is.

The re-design may include reconfiguration of the interconnections between modules, inclusion of additional modules, adjustments to the external inputs, fixing certain parameters at different fixed levels, redesigning and/or recalibrating parameters that may be controlled by the user, etc.

When the user is satisfied with the particular system designed and tested, the particular system is defined by the particular configurations between the modules and/or presets, the fixed parameter settings, the adjustable parameters, the external inputs, etc. These specifications are contained in the program designed by the user on the computer 20, which may be downloaded onto a diskette 22.

The user also knows what external inputs are required, what parameters of the system may be adjusted by the user, and what external outputs are generated by the system. As described below, the user will send all the design specifications to a manufacturer for construction. The manufacturer may offer one or a number of configurations for front panels. Each configuration offered may have, for example, different numbers and types of control knobs and/or levers and/or meters and/or displays, etc. It may also include different layouts of the knobs, levers, meters, displays, etc. If the manufacturer offers a number of configurations of front panels, the user chooses one and adapts the designed system so that the adjustable parameters of the system correspond to particular knobs, levers, etc. offered. The displays or meters may also be adapted to display system parameters. (If the manufacturer offers only one such layout, then the customer adapts his system to that one panel.) The customer also supplies the calibrations for the front panel knobs, meters, etc., as well as the artwork for the panel.

The customer may also adapt the system so that the various external outputs and inputs for the system correspond to a standard layout of jacks offered by the manufacturer. These will normally be a bank of standard electronic jacks placed on the rear of the cabinet.

Alternatively, if offered by the manufacturer that constructs the system, the user may design an entirely custom cabinet having a front face with control knobs, buttons, meters, menus, etc. that correspond to the adjustable parameters of the particular system.

Figure 2:
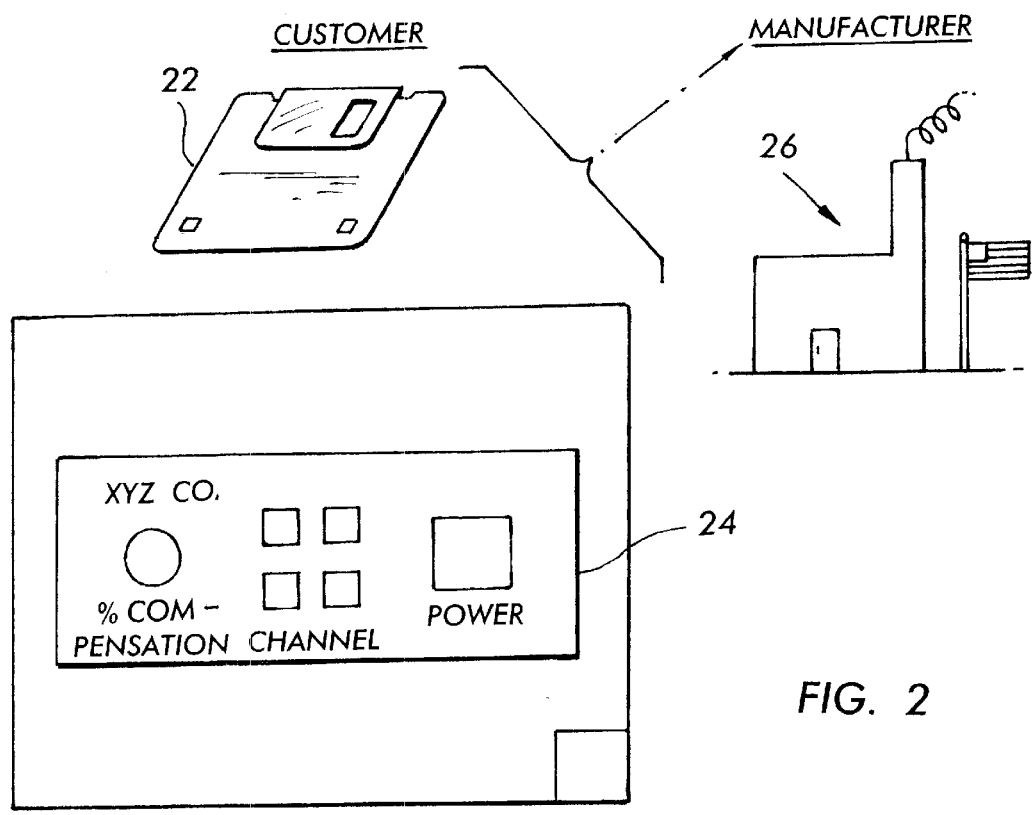
FIG. 2 is a representative drawing of a configuration of a particular system and cabinet design sent by a customer to a manufacturer for building.

FIG. 2 shows a diskette 22 including the program for a particular system designed by the user and the user's design of the front panel of a cabinet for the particular system. (The artwork of the design of the front panel 24 shown may also be included in a software file on the diskette 22.) As noted, this information completely defines the particular system designed. If the front panel 24 shown in FIG. 2 is one of a number of standard front panels offered by the manufacturer 26, then the customer is shown to have adapted the "% compensation" parameter of the system to interface with the left knob, the "channel" parameters to interface with the central buttons and the "power" parameter to interface with the right button. The customer also designs and sends the labels for the controls, the calibrations (not shown) and the other artwork for the panel, such as the company logo and color.

The diskette 22 and the front panel design 24 are sent by the user (customer) to a manufacturer 26 for construction, as also represented in FIG. 2. (As noted above, the front panel design 24 may also be included in a software file on the diskette 22.) The manufacturer 26 is knowledgeable of the universal system 10 and, in particular, the modules and presets comprising the system. The manufacturer 26 retrieves the customer's design specifications of the particular system from the diskette 22. Based on those design specifications, the particular system is implemented in a separate cabinet using those modules, presets and supporting hardware (such as a processor) required by the particular system. The particular system as built includes at least those modules, presets and supporting hardware required to support the particular system and, preferably, no more. The modules, presets, and any supporting hardware and software are configured and/or programmed as specified in the design.

In addition, the manufacturer constructs a front panel for the cabinet according to the customer's front panel design 24. As noted above, where the manufacturer 26 offers a select number of front panel configurations, the customer has adapted the designed system so that the adjustable parameters of the system correspond to the particular knobs, buttons, etc. of a selected panel, such as the front panel 24 configuration shown in FIG. 2. Also, the customer supplies, the calibrations for the controls, the function labels and the artwork for the panel. Thus, the manufacturer 26 connects the controls on the panel selected with the system so as to provide the adjustments to the adjustable parameters of the system as designed by the customer. The manufacturer 26 also creates the labels, calibration and other artwork on the front panel, as designed by the customer.

Where the manufacturer can supply a completely customized front panel, it constructs a front face having the control knobs, buttons, etc. in the positions designed by the customer. The controls are configured together with the system to provide the adjustments to the adjustable parameters of the system in the manner designed by the customer. The manufacturer also creates the labels, artwork, etc. on the front panel as designed by the customer. A completely customized panel, of course, is more expensive than having the customer chose one of a number of standard configurations offered by the manufacturner.

The system designed by the customer may also include external inputs and/or outputs, such as audio inputs or outputs. In general, these interfaces will be standard electronic jacks placed by the manufacturer on the rear of the unit. The manufacturer may offer to customize the placement and labeling of these interfaces.

When completed, the device built by the manufacturer uses substantially only the modules and supporting hardware and software of the universal system needed to implement the particular system designed by the customer. Since the particular system is implemented using the standard modules, etc. used in the universal system, the particular system will be identical to the one the customer designed and tested. In addition, the front panel of the cabinet is designed and implemented for the particular system according to the customer's design.

Figure 2A:
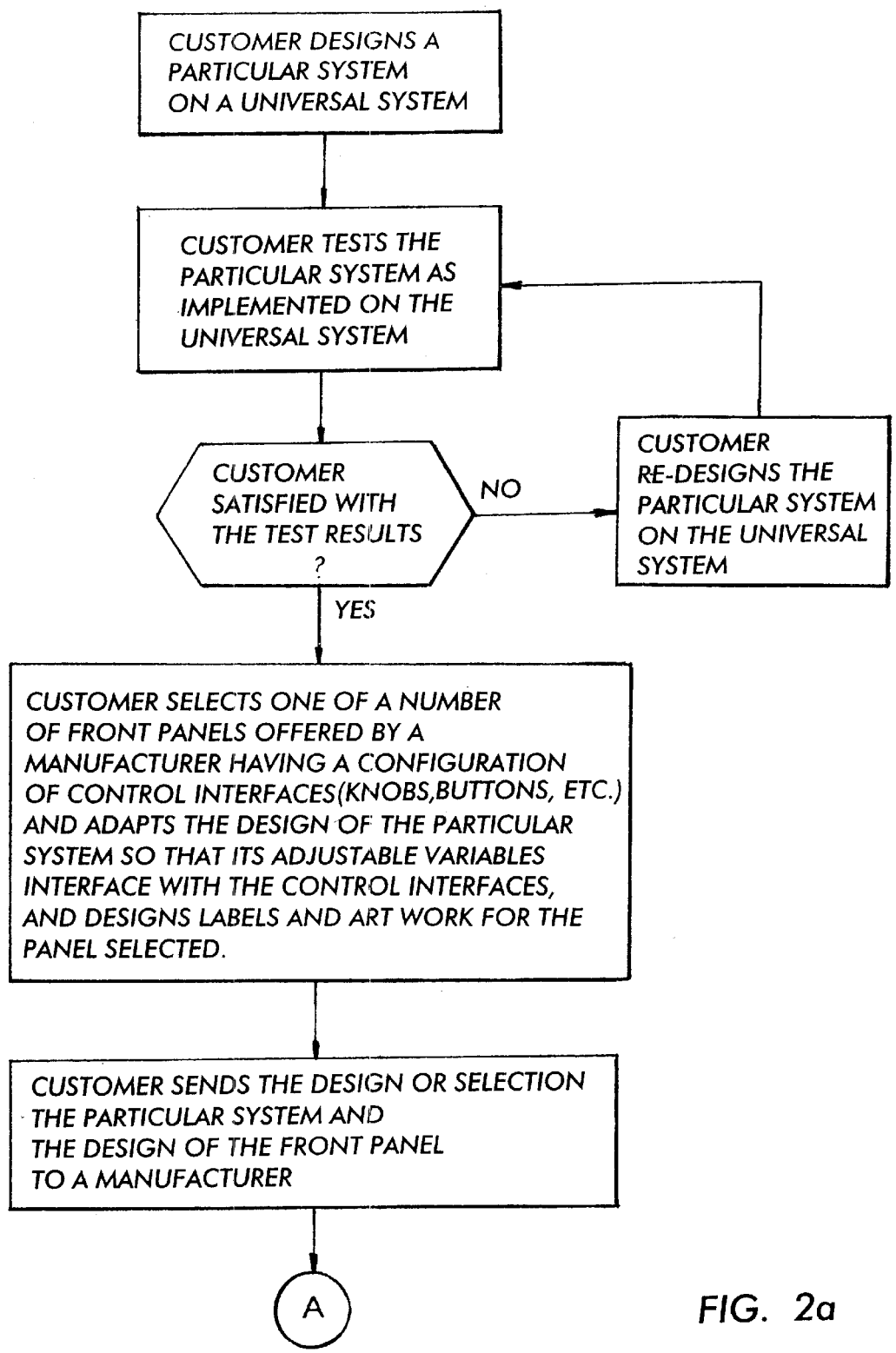
FIGS. 2a–2c is a flowchart representing an embodiment of the present invention.
Figure 2B:
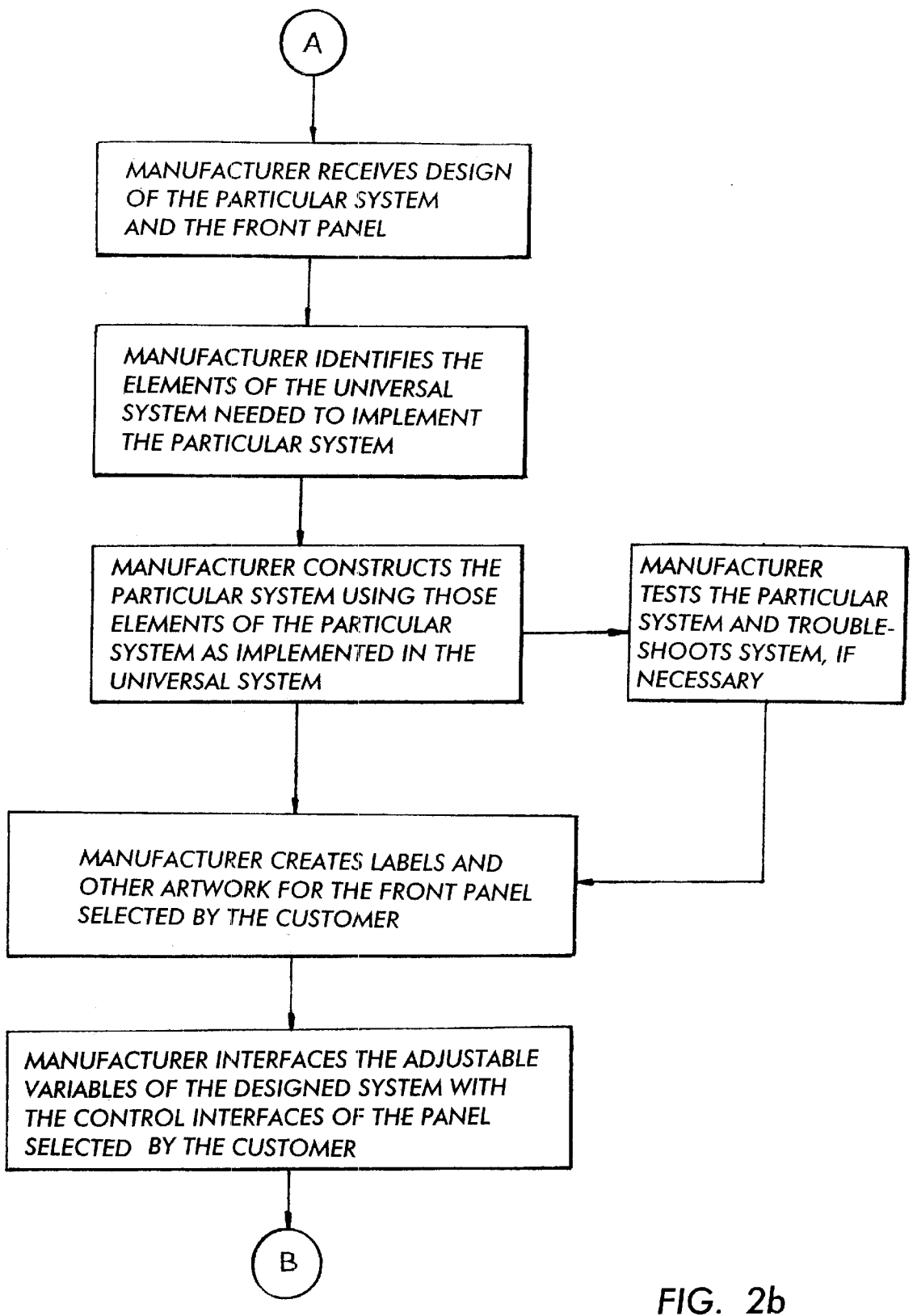
Figure 2C:
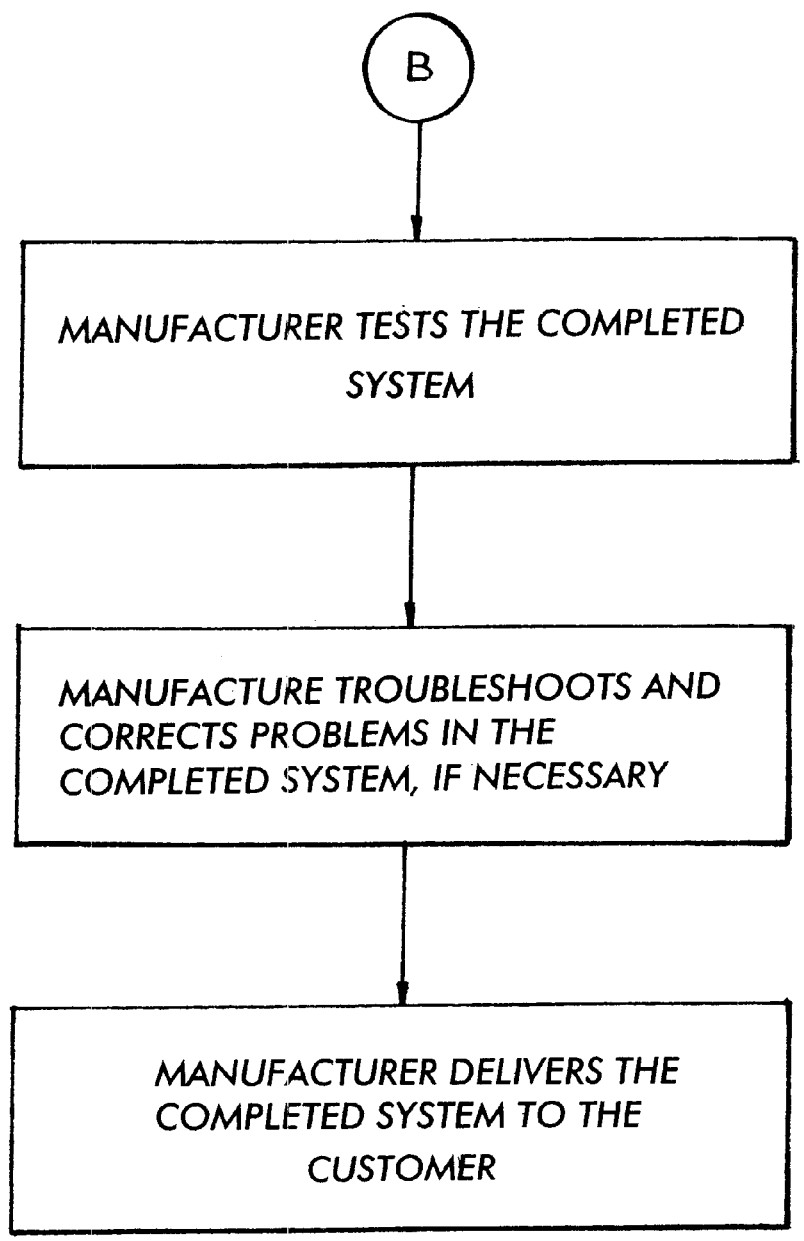

FIGS. 2a–2c depict a number of the features of the general method as described above in the form of a flowchart.

EXAMPLE 1

Figure 3A:
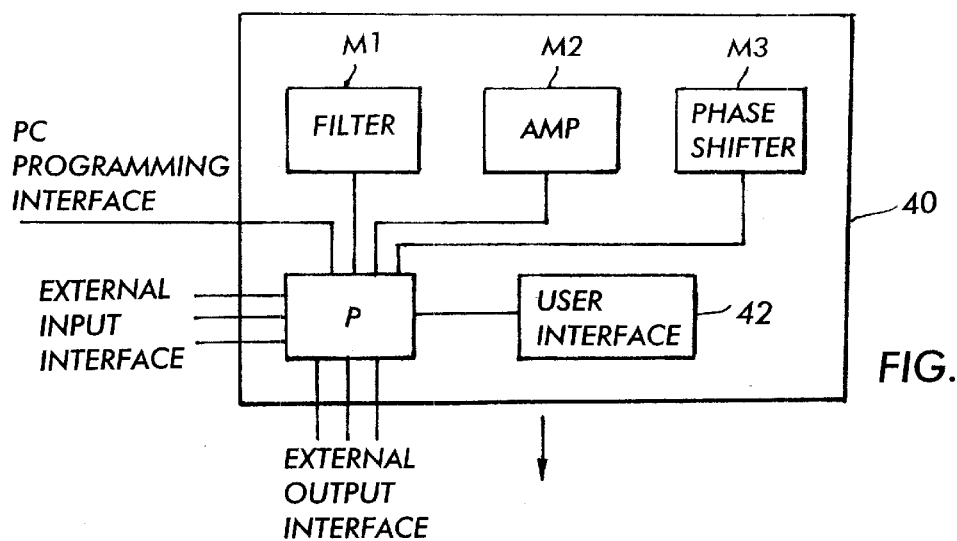
FIG. 3a is a representative drawing of a programmable digital signal processor.

FIG. 3a is a representation of a programmable digital signal processor (DSP) 40, which is a universal system. DSP 40 has three modules, M1, M2, M3, which are a filter, amplifier, and phase shifter, respectively. The filter M1, amplifier M2 and phase shifter M3 modules each interface with processor P, as represented by the lines connecting the processor P and modules M1–M3. The modules M1–M3 are all digital components, created using chips and software residing in the memory of the processor.

Processor P also interfaces with user interface 42, which is a set of knobs, buttons, etc., which can be configured to provide user control over the system's adjustable parameters. Processor P also interfaces with external input interface and external output interface. Finally, processor P interfaces with a PC programming interface.

A PC having the appropriate programming software is used to send a particular design configuration to processor P, for example, a design comprised of a filter followed by an amp. Processor P receives software for implementing the design and thus links one of the internal inputs (an audio input) to the input of the filter module M1, links the output of filter module M1 to the input of amp module M2, and links the output of amp module M2 to one of the external outputs (an audio output). In addition, processor P creates a control link between a knob on the user interface 42 and filter module M1, whereby the frequency band of the filter module may be adjusted by the user, as well as a control link between a second knob on the user interface 42 and the amp module M2, whereby the percentage of amplification may be controlled by the user.

The design can either reside in a software program generated in the PC that may be directly loaded and utilized by the processor P. Alternatively, it may be a set of instructions utilized by processor P to generate its own software program of the design.

Figure 3B:
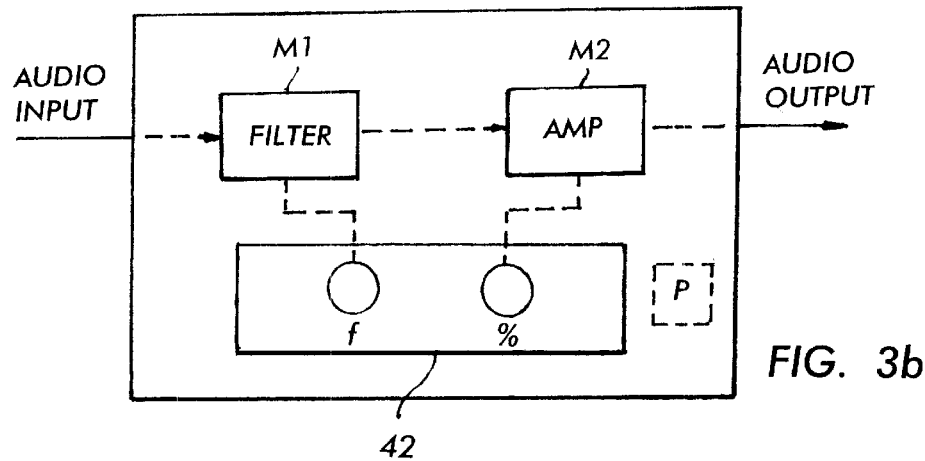
FIGS. 3b–3e are representative drawings of the design and implementation of a particular system and front panel in accordance with the present invention.

FIG. 3b represents the particular system as designed. An audio input is supplied to the filter (M1), the filter output is supplied to amplifier (M2), and the output of amplifier is supplied to an audio output. Two knobs on user interface 42 (labeled "f" and "%") are shown which are configured to control the frequency of the filter module M1 and the percent amplification of the amplification module M2, respectively.

In the depiction of the particular designed system shown in FIG. 3b, a dashed line is used to show the connection between the filter M1 and the amp M2. In addition, a dashed line is shown to connect the audio input of the particular system to the filter M1 and a dashed line is shown to connect the amp M2 to the audio output. Finally, a dashed line is shown to connect control knob f with filter M1 and another dashed line is shown to connect control knob % to amp M2.

As noted, the particular system of FIG. 3b is implemented in the DSP 40 of FIG. 3a. The dashed lines used in the depiction of FIG. 3b thus represent that the connections for the particular system are implemented on the DSP 40 as described above and, in particular, via the processor P of the DSP 40. Thus, the processor P is also shown in ghost in FIG. 3b. In addition, although the components used in the particular system are the only ones shown in FIG. 3b, the other components of the DSP (i.e., the phase shifter module M3, other external inputs and outputs, control knobs on the user interface, etc.) exist but are dormant.

The user tests the particular system shown in FIG. 3b as implemented in the DSP of FIG. 3a. Presuming that the user is satisfied with the particular system designed, the specifications for the particular system are sent to a manufacturer to be built as a separate stand alone system. The specification is comprised of how the various modules, interfaces and controls of the DSP shown in FIG. 3a are configured to implement the system shown in FIG. 3b. These specifications may be sent to the manufacturer in hardcopy form or via software, such as the software program developed by the user on the PC of FIG. 3a when designing the particular system.

In addition, a layout of the control panel for the control knobs of the filter and amp are designed by the user and sent to the manufacturer. Where the manufacturer offers a number of front panels each having a established configuration of knobs, buttons, displays, etc., the user selects one. The user adapts the design of the particular system so that the control knobs of the filter and amp correspond to the particular knobs, etc. of that particular configuration. The user provides the function label, calibration, etc. for each knob, button, display, etc. on the selected panel.

In this example, only two knobs are shown as needed for the particular system on the user interface. The two knobs from interface 42 are shown in FIG. 3b as configured to provide control inputs to the filter M1 and amp M2 modules. Thus, if one of the panels offered by the manufacturer has three knobs and a display meter, as shown in FIG. 3c for example, the user might adapt the particular system designed so that one of the knobs (labeled "f(Hz)") will control the frequency of the filter M1 and another (labeled "%") will control the percentage of amplification of the amp M2, as shown in FIG. 3d, for example. The third knob and the meter might be left inactive, as shown in FIG. 3d. Alternatively, the user might adapt the system so that the frequency of the filter M1 and percentage of the amplification of the amp M2 can be displayed on the meter, and adapt the third knob (labeled "Display" and having positions "f" and "%") so that it selects which of the two parameters is displayed, as shown in FIG. 3e. The display thus displays the parameter selected using the third knob.

In either case, the user also provides the labels, calibrations and artwork for the front panel designed. As shown in FIGS. 3d and 3e, this can also include the company name or logo ("Acme"), for example.

The manufacturer uses the user's specification to build the particular system using the user's specifications and layout. The particular system is built using only those portions of the DSP 40 of FIG. 3a needed to implement the particular system as shown in FIG. 3b. Thus, only the software and hardware of the DSP 40 that is necessary to create the filter module M1 and the amp module M2 is used. Only software necessary to provide the links between the modules M1 and M2, the controls and one audio input and one audio output depicted in FIG. 3b are included by the manufacturer in manufacturing the particular system. The particular system will include a processor, but includes less software than the universal system, since it will only have to support the particular system shown in FIG. 3b. It will therefore not have to be programmable, and will not have to support the other aspects of the universal DSP shown in FIG. 3a, such as the phase shifter module M3, multiple inputs and outputs, multiple controls, etc. All other hardware components of the universal DSP, such as chips, switching, external interface connections, control knobs and buttons, etc., that are not needed in implementing the particular system shown in FIG. 3b are excluded.

As noted above for this example, FIG. 3b depicts the particular system designed as implemented on the DSP of FIG. 3a. As also noted directly above, the particular system built by the manufacturer will use only the modules, software and hardware from the DSP needed to support the particular system. Thus, the particular system as built by the manufacturer will likewise be represented as shown in FIG. 3b. However, the particular system as manufactured will not include the other components of the DSP.

The manufacturer also builds a front panel as selected and configured by the user, such as one of the panels shown in FIGS. 3d and 3e, for example. Using the front panel selected by the user, the manufacturer interfaces the adjustable parameters of the particular system to the control knobs, displays, etc. of the panel in accordance to the user's design. The manufacturer also creates the labels, calibration and other artwork on the front panel as specified by the user. Thus, the unit returned to the user includes a customized internal system and a customized front panel.

The user will also supply external system inputs and outputs (such as audio inputs and outputs) to the manufacturer, who will usually configure them to interface with standard electrical jacks on the back of the unit that is built.

Since the system as built has the identical modules and other software and hardware components to create the particular system as was used in the universal system by the customer to design, implement and test the particular system, the particular system built and returned to the customer will perform identically to the one tested by the customer. It will also be quick and inexpensive to build, since it relies on pre-existing modular components that can be configured using standard software, and will only use those portions of the universal system that are necessary to implement the particular system.

EXAMPLE 2

Figure 3F:
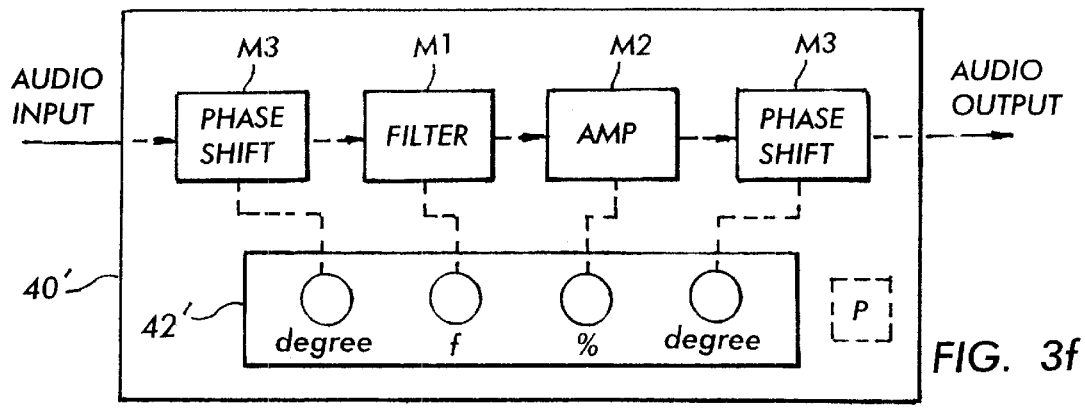
FIG. 3f is a representative drawing of the design and implementation of a particular system in accordance with the present invention
Figure 3C:
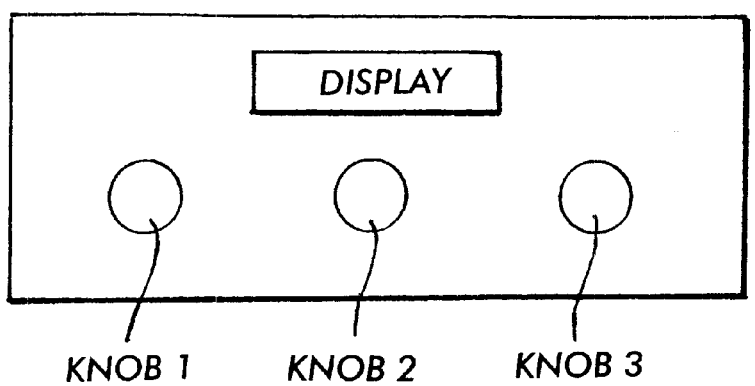
Figure 3D:
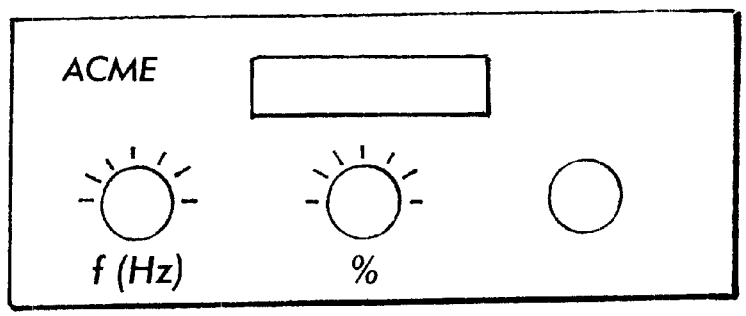
Figure 3E:
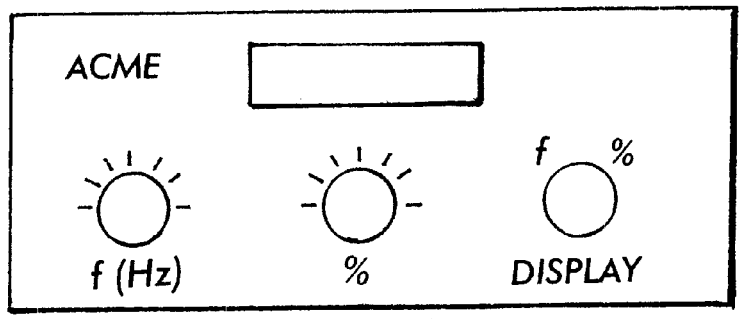

FIG. 3f shows a second, more complex particular system designed by a user using the universal system of FIG. 3a. In this system, all three modules M1–M3 are used, the phase shifter module M3 being invoked twice. (Since the system is digital, the software and hardware supporting module M3 may be accessed twice by the processor, which would also be programmed to supply the appropriate inputs.) The connections between modules for this particular system are again shown in dashed lines, representing that they are made via the processor P, also shown in ghost. The specifications for this particular system, once designed and tested by the user, would be sent to the manufacturer and built to specification as described above. In this system, of course, additional hardware and software of the universal system would be included in the implementation. The particular system has additional user controls, and the customer would also chose a front panel offered by the manufacturer and adapt the system so that the controls for the particular system corresponded to the knobs, levers, etc. as configured on the panel selected. The customer would also supply the artwork, calibrations and labels for the front panel selected.

As described above, the Orville™ DSP available from Eventide, Inc. (Little Ferry, N.J.) is a universal system, having numerous modules and hundreds of presets. In addition, the Orville™ is programmable, thus allowing the user to design custom effects by uniquely configuring the modules and presets. The time required by the Orville™ to execute such a custom effect is negligible, thereby allowing the user to immediately experience the designed effect, and thus to quickly re-design and re-test it.

Documentation included with the Orville™ describes how to operate the Orville™ to obtain and manipulate the adjustable parameters of its pre-programmed effects (i.e., its presets). The documentation also describes how to design and implement custom effects using the modules and presets of the Orville™. This may be done directly on the front panel of the Orville™ (in the "Patch Editor" area). Alternatively, effects may be designed on a PC using software ("VSIGFILE") available from Eventide and then downloaded to the Orville™ for implementation.

More particular details of the Orville™ and its capabilities are described in the Orville™ Operating Manual (part no. 141032, Manual Release 1.1, Jul. 28, 1999), which is hereby incorporated by reference. The list of presets, "Orville Presets V2.600", dated Aug. 18, 1999, is hereby incorporated by reference. (A two page document included with the Orville Presets V2.600 entitled "Read Me First!" and dated Aug. 18, 1999 is also hereby incorporated by reference.) Details on how to program the Orville™ are found in the Orville™ Programming Manual (part no. 141035, Manual Release 1.1, Jul. 28, 1999), which is hereby incorporated by reference, and the Orville™ Modules Manual (Part No. 141035a, Manual Release 1.1, Jul. 29, 1999), which is hereby incorporated by reference. (All of the above-referenced documents are included with the Orville™ and are available from Eventide, Inc.)

As noted, the VSIGFILE software referred to above is one vehicle for programming custom effects in the Orville™. VSIGFILE (including a "Help" file) is available from Eventide and may be downloaded from Eventide's website. The VSIGFILE software presently used for the Orville™ is the V1.52 Beta version. The VSIGFILE User Manual V1.0 (Jan. 13, 1997) is hereby incorporated by reference. (It is noted that the VSIGFILE User Manual V1.0 is labeled "Draft" and also states it is the "Graphical Editor for the 4000 Series Ultra-Harmonizer©". Nonetheless, this manual is the current edition of the manual for the VSIGFILE V1.52 Beta version.)

Particular effects designed and tested on the Orville™ to the user's satisfaction may be implemented in a customized unit. The user sends the design for the effect to a manufacturer knowledgeable of the Orville™ and having the capability to build a unit for the designed effect using the standard hardware and software in the Orville™.

The manufacturer may offer a number of front panels having different layouts of knobs, switches, meters, etc. The user selects one of the panels and adapts the particular system designed so that particular knobs, buttons, etc. interface with the adjustable parameters of the system, as well as display particular parameters on meters or displays on the panel selected. The user also designs the labels for the controls, the calibration and other artwork for the front panel selected. The user sends the front panel specifications to the manufacturer along with the design for the effect.

(Alternatively, the manufacturer may offer to build a completely customized front panel, where the front face of the cabinet is laid out entirely by the user.)

The manufacturer then builds a customized unit for the designed effect. The unit contains those modules, presets, hardware and software of the Orville™ necessary to support the designed effect (and, preferably, no more) and is configured specifically to implement the designed effect. The particular unit is tested by the manufacturer and then returned to the user. The particular unit is implemented using the modules, presets and other hardware and software elements as used in the Orville™ to generate the same effect. The front panel (whether selected from a number of standard layouts or completely designed by the user) is constructed to the user's specification, so that the knobs, buttons, etc. interface with the control (adjustable) parameters of the system. It also includes the artwork as designed by the user. Thus, the user receives a customized unit that operates identically to the one previously tested to the user's satisfaction on the Orville™.

EXAMPLE 3

A modulating filter may be created on the Orville™ using the VSIGFILE software. The VSIGFILE is loaded into the user's PC and interfaced with the Orville™ as described in the Orville™ Programmers Manual. The "General Principles Chapter" of the Orville™ Programming Manual also includes general material on programming and pages 24–26 of the Programming Manual describes how to create a modulating filter in the Orville™.

Figure 4:
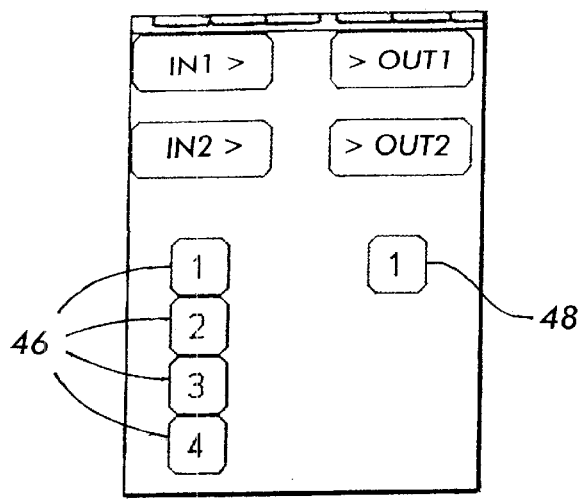
FIG. 4 is a view of an initial PC screen of software used to program a DSP.

With the VSIGFILE loaded, the "New Blank Document" icon is clicked, giving the initial screen shown in FIG. 4. Boxes "in1>" and "in2>" in FIG. 4 represent first and second inputs of the Orville™, which will be configured to provide the inputs to the modulating filter program. Similarly, boxes ">out1" and ">out2" represent first and second outputs of the Orville™, which will be configured to provide the outputs of the modulating filter program.

The boxes "1", "2", "3" and "4" in a column on the lower left of FIG. 4 representing "global inputs", are not used in this example. Box "1" on the lower right of FIG. 4 (labeled with reference no. 48) represents the first "userobject" input on the head module. The head module provides an interface between the modules that are used and the area of the Orville™ that allows the parameters of the modules to be adjusted. Thus, the userobject outputs of modules used are connected to the head module so that the menu pages of the module parameters appear in the PARAMETER area of the Orville™, as will become clear from the description below.

A modulating filter program is based on a low frequency oscillator ("LFO") module and a "modfilter" module. The modules are accessed by clicking "Edit" on the menu bar and then "Add Module", which gives a menu of modules. The LFO module is in the "Oscillator" group and the modfilter module is in the "Filter" group. These files are selected by clicking on them in the menu.

Figure 5A:
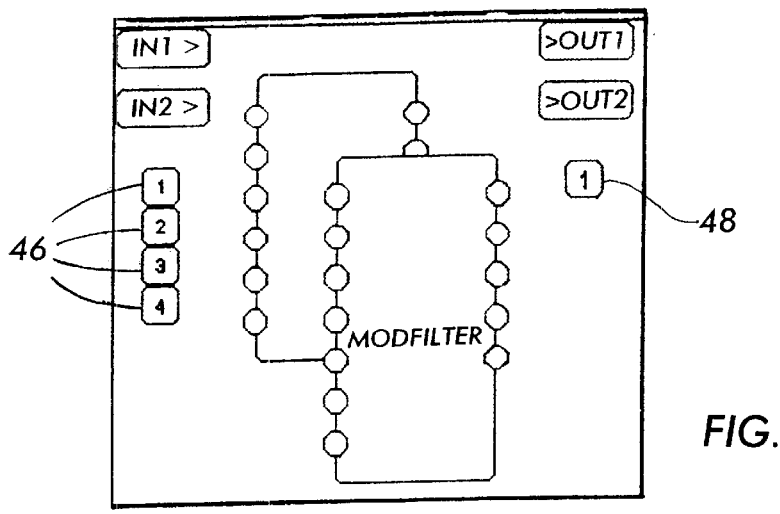
FIGS. 5a–5d are subsequent views of a PC screen of software being used to design a particular system on a DSP.
Figure 5D:
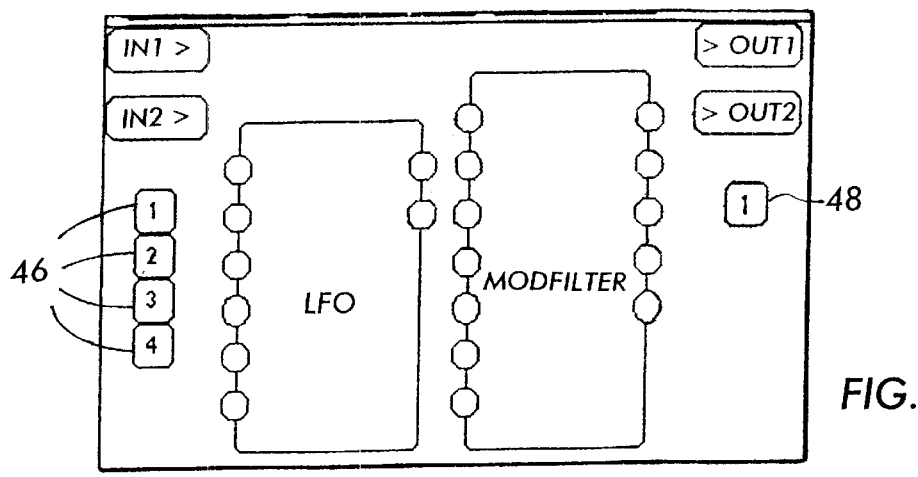
Figure 5B:
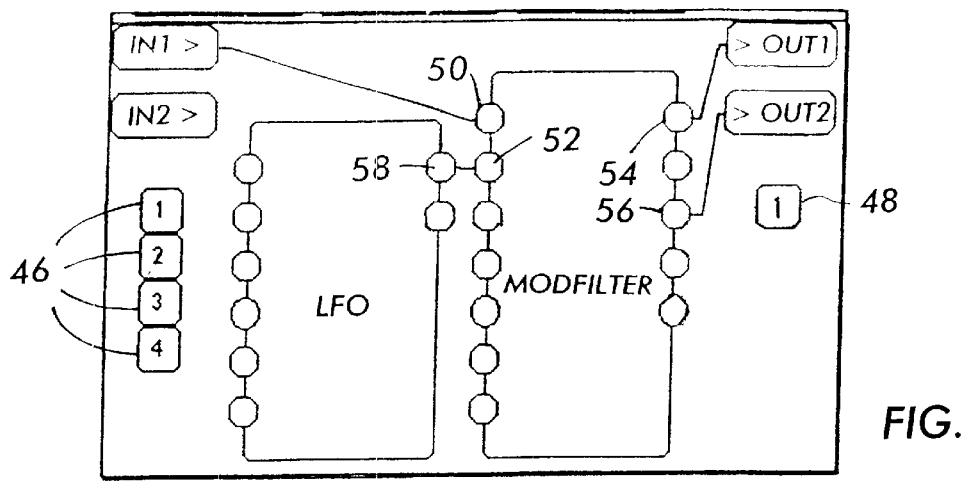

After adding the LFO and modfilter modules, one module will likely overlap and obscure the other on the PC's screen (see FIG. 5a, where the LFO module is partly covered by the modfilter module). The modfilter module may be moved by clicking and dragging to the right, as shown in FIG. 5b for example.

Figure 5C:
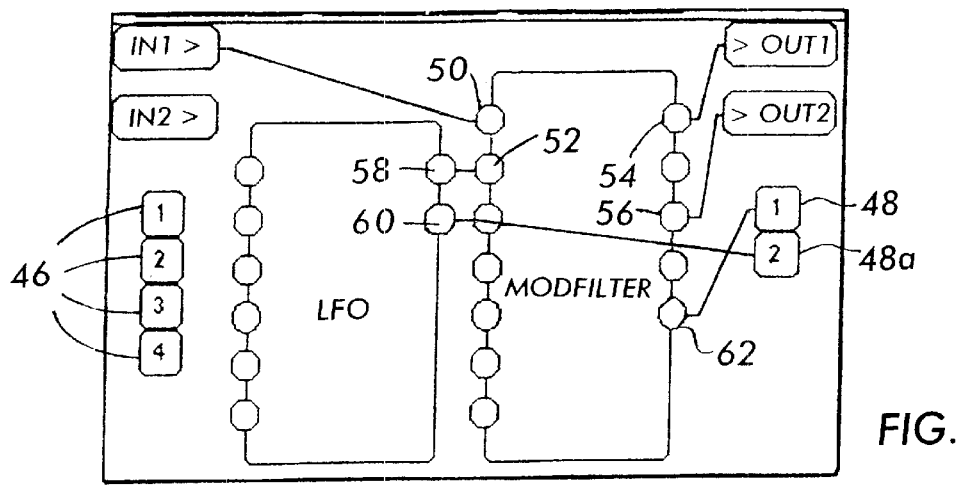

In1> is connected to input ("in") 50 of the modfilter module, as shown in FIG. 5c. The "in" input is identified by positioning the mouse over input 50, whereupon the word "in" appears on the screen. The other inputs and outputs of the modules are identified in like fashion. The functions of the various inputs and outputs are described in the Orville™ Modules Manual.

The connection between In1> and input 50 is made on screen by clicking on in1> and dragging it to the input 50 of the modfilter module. (The connections described immediately below are made in similar fashion.) As also shown in FIG. 5c, lowpass output ("low") 54 of the modfilter module is connected to >out1 and highpass output ("high") 56 of the modfilter module is connected to >out2. The output ("out") 58 of LFO module is connected to the modulation input ("fmod") 52 of the modfilter module.

For the configuration shown in FIG. 5c, the modfilter module will filter a signal ("input signal") applied to its input 50 via input in1> of the Orville™. All frequencies in the input signal that lie below a cutoff frequency of the modfilter module will be output at low output 54 of the modfilter module, which is connected to >out1 (representing an output of the Orville™) All frequencies in the input signal that lie above the cutoff frequency will be output at high output 56, which is connected to >out2 (representing a second output of the Orville™).

In addition, the cutoff frequency of the modfilter module varies as a function of the signal applied to the modulation input 52. Thus, the signal output at the LFO module's output 58 will modulate the cutoff frequency of the modfilter module.

As noted, certain parameters of the modulating filter are adjustable in order to attain desired audio effects. As also noted above, in order to make the adjustable parameters for both the LFO and modfilter modules available in the "PARAMETER" area of the Orville™ when the program is downloaded, the "userobject" outputs of the modules must be connected to the "userobject" inputs of the head module.

In order for the adjustable parameters of both the LFO module and the modfilter module to be available, two userobject inputs of the head module are needed. The head module's first userobject input 48 is clicked on. Then the Edit menu is clicked, followed by the Add Repeating Field option. A second userobject input 48a will appear, as shown in FIG. 5d. As also shown in FIG. 5d, userobject output 62 of modfilter module is connected to the first userobject output 48 of the head module. (As noted above, the connection is made by clicking and dragging.) Also, userobject output 60 of the LFO is connected to the second userobject output 48a of the head module, as shown in FIG. 5d.

With the Orville™ set to an area other than the Patch Editor area, the program is sent from the PC to the Orville™ by clicking on "Send" in the Midi menu. After the software program is downloaded, the designed modulating filter is "built" within the Orville™.

An audio input is plugged into the Orville™ input 1 (corresponding to "in1>" on the PC screen), thus supplying the audio input 50 to modfilter module. The first and second outputs of the Orville™, corresponding to >out1 and >out2 on the PC screen, are each attached to an amplifier and a speaker, thus supplying lowpass output 54 of modfilter module to one speaker and highpass output 56 to another speaker.

Figure 5E:
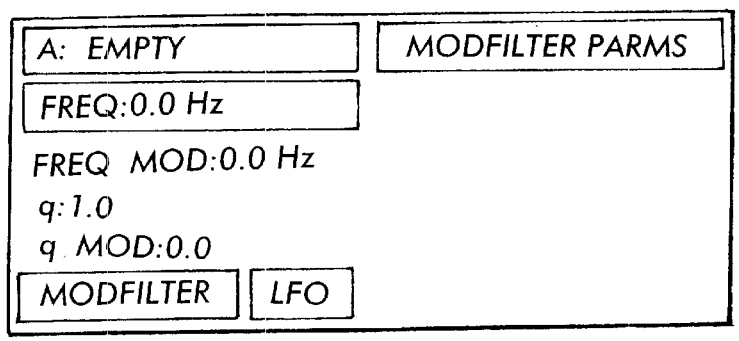
FIG. 5e is a view of an area of a DSP where parameters of the particular system designed in FIGS. 5a–5d are adjusted.

Once the software program is downloaded, the front panel of the Orville™ displays the PARAMETER area, in particular, it displays parameters that may be adjusted for LFO and modfilter modules, as shown in FIG. 5e.

The adjustable parameters shown in FIG. 5e for the modfilter module are the cutoff frequency ("freq"), the frequency modulation ("freq mod"), the quality factor ("q") of the filter and the q factor modulation ("q mod"). Other parameters are adjustable for the modfilter module, including the amount the cutoff frequency may be modulated ("freqmodamt") may be changed for the modfilter module in the PARAMETER area. (The Orville™ Modules Manual describes the adjustable parameters for the modules, including the modfilter and LFO modules.) The menu of parameters for the modfilter module displayed in the PARAMETER area of the Orville™ may be scrolled using the cursor up and down buttons on the front face of the Orville™.

The adjustable parameters for the LFO module are displayed in the PARAMETER area of the Orville™ when the "lfo" box shown in FIG. 5e is selected. (As described in the Orville™ Operating Manual, modules are selected in the PARAMETER area using the left and right cursor keys on the front face of the Orville™.) As described in the Orville™ Modules Manual for the LFO module, parameters corresponding to the shape of the wave, the duty cycle, the frequency of the oscillator, etc. may be changed.

To further customize the design of the modulating filter, the user changes some or all of the adjustable parameters of both the modfilter module and the LFO module via the PARAMETER area of the Orville™ to achieve a desired effect or range of effects. (As also described in the Orville™ Operating Manual, once a parameter is selected from the menu of a module displayed in the PARAMETER area, the parameter value is changed using the KNOB, NUMERIC KEYPAD or the INC/DEC keys.)

The impact of each change on the audio signal is experienced by the user through the speakers instantaneously. Thus, the user may determine values for some of the parameters that will remain fixed, and may determine a range of desirable operational values for other parameters.

For example, by experimenting, the user decides that all of the parameters for the LFO module other than the frequency of the oscillator may be set to certain specific values. For example, the waveshape ("wave") may be set to be a square wave, the modulation ("mod") parameter is set to zero, etc. For the oscillation frequency ("freq") of the LFO, the user determines a desirable adjustment range is between 0 and 50 Hz.

Similarly, the user decides to set most of the adjustable parameters of the modfilter module to certain specific values. For example, the q value of the filter may be set to 2. Since there is no modulation input for the q factor ("qmod"), the amount by which the qmod input modulates the filter is set to zero. The user determines to have the cutoff frequency adjustable between 500 and 10,000 Hz.

Also, the LFO module output 56 modulates the cutoff frequency of the modfilter module (by being the input to the "fmod" parameter of the modfilter). The modfilter parameter "freqmodamt" adjusts how much the cutoff frequency may be modulated by the output 56 of the LFO. The user determines by experimentation to have the frequency modulation amount adjustable between 10 and 25%.

The modulating filter as designed and implemented in the Orville™ with the parameters so customized by the user comprises a "particular system". In the above example, the user selects specific values for most of the parameters for the LFO and modfilter modules that can be adjusted. Three parameters remain adjustable: the oscillation frequency of the LFO (used to modulate the cutoff frequency) is variable between 0 and 50 Hz, the cutoff frequency is variable between 500 and 10,000 Hz and the amount the cutoff frequency may be modulated is variable between 10 and 25%.

The selected parameter values and ranges, which, as described above, are determined by the user by making adjustments via the PARAMETER area of the Orville™, are then entered by the user into the software file on the PC. By clicking on one of the modules on the PC screen (either LFO or modfilter), a table of the parameters for the module appears on the PC screen. Thus, the parameter values and ranges are entered for each module.

The program, including the configuration of the modules for the modulating filter and the customized parameters, is saved from the user's PC onto a diskette. The diskette containing the design is sent to a manufacturer for construction, as explained further below. The manufacturer may offer a number of standard front panels. For example, one of the front panels that the manufacturer offers may have three knobs, an LCD display and a fourth knob for selecting what is shown on the LCD. The user selects one knob to control the oscillation frequency, another knob to control the cutoff frequency of the filter and the third knob to control the amount the cutoff frequency may be modulated. The user also specifies that the fourth knob selects between the three parameters for display on the LCD.

In addition, the user supplies the design for the front panel, for example, by using a computer graphic file supplied by the manufacturer for the chosen panel. The design includes the calibrations for the three knobs, i.e., 0 to 50 Hz for the knob controlling the oscillation frequency, 500 to 10,000 Hz for the knob controlling the cutoff frequency and 10 to 25% for the knob controlling the amount the cutoff frequency may be modulated. It also includes labels for the knob selecting the parameters shown on the LCD display and other artwork for the front panel.

The specifications for the customized modulating filter and the design for the front panel are sent to a manufacturer knowledgeable in the construction and operation of the Orville™. The manufacturer builds the modulating filter designed by the user in a separate unit using only the hardware and software from the Orville™ needed to support the design. Thus, hardware and software needed to support the LFO, modfilter, and head modules are included. Many of the parameters for the modules are set to specific values selected by the user, as described above. The hardware and software of the separate unit supports the adjustability of the oscillation frequency, the cutoff frequency of the filter and the amount the cutoff frequency may be modulated, for the ranges described above.

The manufacturer constructs the hardware and software of the separate unit to interface with the standard front panel selected so that one knob as selected by the user controls the oscillation frequency, another knob controls the cutoff frequency of the filter and the third knob controls the amount the cutoff frequency may be modulated. The hardware and software also interfaces with the fourth knob and the LCD so that the fourth knob selects between the three parameters, which is displayed on the LCD.

Finally, the manufacturer labels the knobs (including the calibrations) and provides other artwork on the front panel as specified by the user.

The unit built and returned to the user by the manufacturer uses the same hardware and software as that invoked in the Orville™ by the user when designing and customizing the modulating filter. It thus operates identically to the modulating filter as designed and implemented by the user in the Orville™. However, the unit includes far less hardware and software than the Orville™. By using the same hardware and software to construct the modulating filter, while leaving out all other hardware and software found in the Orville™, the price of the unit delivered is much lower than the Orville™. Finally, the front panel of the unit built and returned to the user has knobs that control the adjustable parameters over the ranges specified by the user and also includes the labels, calibrations and other artwork specified by the user.

The Orville™ DSP includes approximately 170 modules and 900 presets and also includes extensive software allowing these modules and presets to be configured together as desired by the user. Because of its universal nature, the cost of an Orville™ is currently approximately $5700. On the other hand, the particular system described in the example above only uses simpler hardware and would cost approximately $2000 to design using the Orville™ and then build using the method described above. For example, the Orville™ includes two processors, whereas most particular systems designed by a customer and built would only need one. For a customer that will use the particular system on a frequent basis, it is clearly a more efficient and economical implementation than using the Orville™ itself.

The design of a particular system may be transmitted to the manufacturer in other manners, such as over a telecommunications connection, for example, a fax, modem or internet connection. In addition, the universal system may be at a location remote from the customer and which is accessed and used by the customer for designing the particular system. The remote location may be the site of the manufacturer or other site. Access to the universal system may be made available to the customer via an internet connection, for example. The connections may be other connections that provide two way digital communications, such as a modem connection or a satellite connection.

The customer may transmit the particular design over the connection, where it is implemented in the universal system as described above, and a sound or other output file of the particular system is sent back to the customer. The design may be reconfigured by the customer, sent over the connection and implemented in the universal system. The output is sent back through the connection to the customer. In this manner, the particular system may be designed and tested using a universal system at a remote location.

Once the customer is satisfied with the design, the customer may indicate through the connection that the last design is the desired one. The particular system is then separately built by the manufacturer based on the standard modules and other features of the universal system, as described above.

The design specification for the system would also include selecting one of a number of front panel configurations offered by the manufacturer. The system as designed would include having various adjustable control parameters interface with the knobs, buttons, meters, etc. on the selected panel. The customer would also transmit the labels, calibrations and other artwork for the front panel to the manufacturer. This could also be accomplished by the manufacturer supplying a set of physical measurement templates (in software form) for the various panel options offered. The customer would then use his own computer to add colors, designs and text, and then transmit the file back to the manufacturer. The software could also be transmitted using a telecommunications connection, for example, fax, modem or internet connection.

Alternatively, as previously described, the manufacturer could supply a blank template and the customer could design and transmit a completely customized front panel layout, if the manufacturer offers such a service.

Finally, the customer's design of the system may also include various external inputs and outputs, for example, audio inputs and/or outputs. These would usually be assigned to one or more standard electrical connections placed on the rear of the unit delivered, although the manufacturer might also provide the customer with the option to design the placement of these interfaces.

Although the present invention has been described in relation to particular embodiments thereof, many other variations and modifications and other uses will become apparent to those skilled in the art. Thus, the present invention is not limited by the specific disclosure herein.

What is claimed is:

1. A method for manufacturing a particular system based on a universal system having a plurality of elements, the method including the steps of:

a) designing the particular system on the universal system, b) testing the particular system as implemented on the universal system, c) repeating steps a) and b) until the particular system as tested on the universal system is acceptable, and d) sending the design of the particular system to a manufacturer to be built using the elements of the universal system used to implement the particular system, wherein the universal system is at a remote location and the step of designing the particular system includes sending the design of the particular system for implementation in the universal system over a telecommunications connection, and wherein the step of testing the particular system includes transmitting an output of the particular system as implemented in the universal system over the telecommunications connection.

2. A method as in claim 1, wherein the telecommunications connection is an internet connection.

3. A method for manufacturing a particular system based on a universal system having a plurality of elements, the method including the steps of:

a) designing the particular system on the universal system, b) testing the particular system as implemented on the universal system, c) repeating steps a) and b) until the particular system as tested on the universal system is acceptable, d) sending the design of the particular system to a manufacturer to be built using the elements of the universal system used to implement the particular system, and e) adapting adjustable parameters of the particular system to interface with manual control interfaces on one of one or more front panels having different configurations of manual control interfaces.

4. A method as in claim 3, wherein the step of sending the design of the particular system to a manufacturer to be built includes sending the adjustable parameters of the particular system with the manual control interfaces on the one of the one or more of the front panels.

5. A method as in claim 4, wherein the step of sending the design of the particular system to the manufacturer is performed by sending the design to the manufacturer in a software format.

6. A method as in claim 4, wherein the step of sending the design of the particular system to a manufacturer to be built includes sending the design over a telecommunications connection.

7. A method for manufacturing a particular system based on a universal system having a plurality of elements, the method including the steps of:

a) receiving a design of the particular system as implemented on the universal system, b) identifying the elements of the universal system used to implement the particular system, c) constructing the particular system by including those identified elements of the universal system, and d) receiving specifications interfacing adjustable parameters of the particular system with manual control interfaces on one of one or more front panels having different configurations of manual control interfaces.

8. A method as in claim 7, wherein the step of constructing the particular system includes constructing the front panel as specified.

9. A method as in claim 8, wherein the step of receiving the design of the particular system includes receiving the specifications interfacing the adjustable parameters of the particular system with manual control interfaces.

* * * * *